United States Patent Office 3,051,068
Patented Aug. 28, 1962

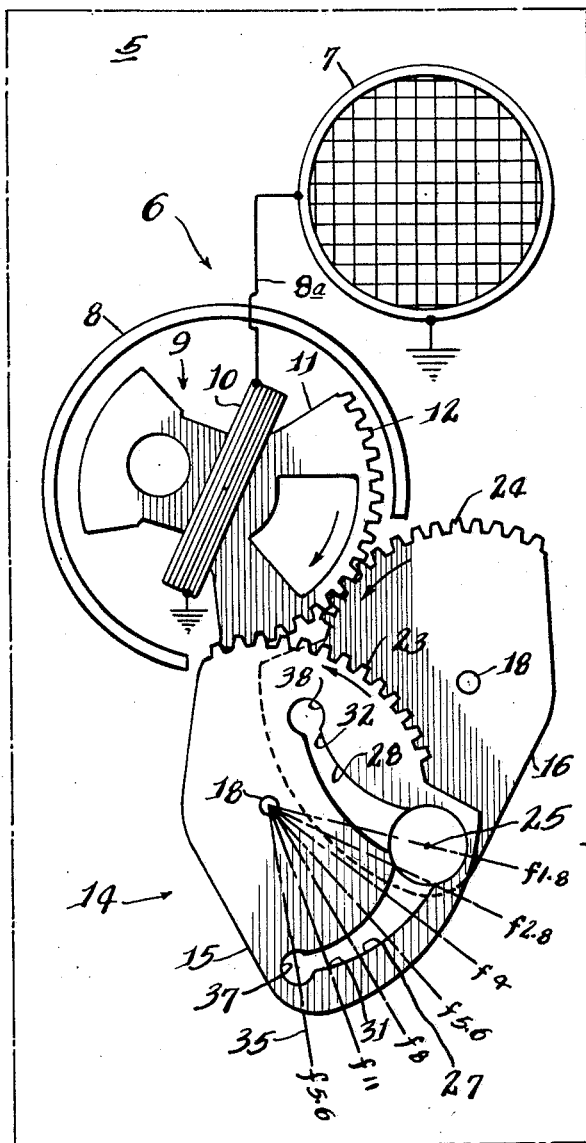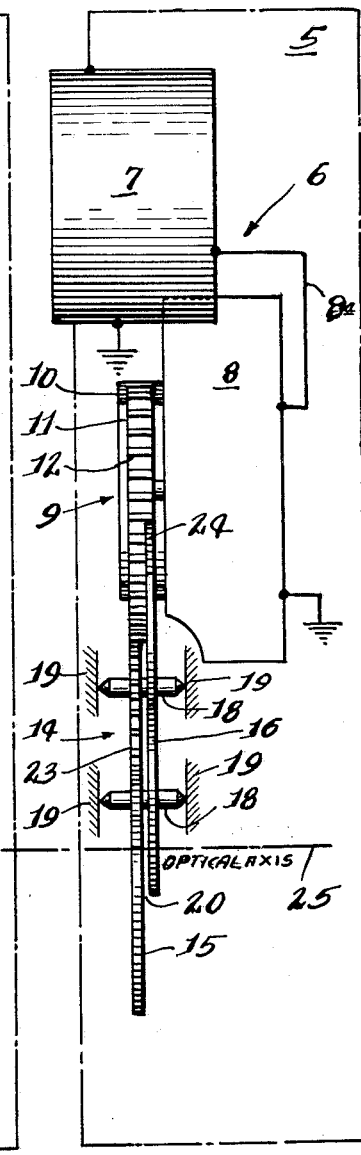

3,051,068
AUTOMATIC PHOTOGRAPHIC EXPOSURE CONTROL WITH GLARE COMPENSATION AND BACK-LIGHT COMPENSATION
Robert A. Shimkus, Chicago, Ill., assignor, by mesne assignments, to Revere Camera Company (formerly Samica Corporation), a corporation of Delaware
Filed July 14, 1958, Ser. No. 748,349
6 Claims. (Cl. 95—64)

This invention relates to an automatic photographic exposure control with glare and back-light compensation.

Photographic cameras are being constructed with a built-in light meter which is effective automatically to adjust the aperture of the iris diaphragm in accordance with the luminous intensity of the camera field. In most instances the light which energizes the light meter is reflected from the subject toward which the optical axis of the camera is directed.

Such an automatic exposure control provides a large iris opening or aperture under conditions of low luminous reflection from the subject, and a small iris opening under conditions of high luminous reflection. By way of example, the minimum sized iris opening may be established by a front-lighted subject illuminated by sunlight on a clear day. The luminous intensity of such a subject is approximately 300 candles per square foot.

It occasionally is necessary or desirable with such a camera to photograph subjects which are back-lighted or side-lighted, that is, the sun or other source of illumination is to the rear or side of the subject. The luminous intensity of direct light from the sun or other bright source is in excess of about twice the brightness of a front-lighted subject illuminated by sunlight on a clear day. Under this condition the light meter of the automatic exposure control will be effected more by the direct light from the sun or other source of illumination than by the light reflected from the subject, and accordingly the iris diaphragm stops down lower than the proper value for the subject. This results in an underexposed picture.

The present invention takes advantage of the aforesaid large differential in brightness and provides an iris opening of intermediate size (a stop or two larger than minimum) to satisfy the exposure conditions imposed by back-lighting or side-lighting of the subject. At the same time it limits the minimum iris opening to that required for the normal front-lighted subject, e.g. 300 candles per square foot.

Other objects, advantages and details of the invention will be apparent as the description proceeds, reference being had to the accompanying drawing wherein one embodiment of the invention is shown. It is to be understood that the description and drawing are illustrative only and that the scope of the invention is to be measured by the appended claims.

In the drawing:

FIG. 1 is a fragmentary, somewhat diagrammatic, front elevational view of an automatic photographic exposure control with glare compensation embodying the invention, and FIG. 2 is a view in side elevation of the apparatus shown in FIG. 1.

As used herein, the expression "minimum picture-taking intensity" refers to the luminous intensity of light reflected from a subject which is just sufficient to energize the light meter and cause minimum movement of the meter. Under this condition the iris opening or aperture is maximum in size and proper for picture taking with the indicated illumination. The expression "maximum normal picture-taking intensity" refers to the aforesaid condition of normal brightness wherein a front-lighted subject is illuminated by sunlight on a clear day. Under this condition the iris opening or aperture is minimum in size and proper for picture taking with the indicated illumination.

Subjects having luminous intensities of values intermediate the foregoing are effective automatically to establish iris openings of proper intermediate size for the respective luminous conditions.

This invention, as previously mentioned, modifies the conventional automatic exposure control described above and provides an iris opening or aperture of intermediate size for back-lighted or side-lighted subjects. By use of this invention, underexposed pictures are avoided, and pictures of back or side-lighted subjects appear in full or substantially full detail.

Referring now to the drawing, an exemplary automatic exposure control embodying the invention is illustrated more or less diagrammatically in fragmentary camera 5.

A light meter 6 comprises a photoelectric cell 7 and a meter 8 which is energized by cell 7 in response to the luminous intensity of the subject toward which the optical axis of the camera is directed. Cell 7 and meter 8 each have two electrical terminals. As here shown, one terminal of each is grounded and the other terminals are connected by conductor 8a.

Meter 8 includes a movement 9 which has a coil 10 and a segment gear 11. The latter has peripheral teeth 12 of substantial axial dimension (FIG. 2).

An iris diaphragm assembly, generally designated 14, comprises one or more iris blades. In the embodiment shown, diaphragm assembly 14 has two blades 15 and 16.

Iris blades 15 and 16 are movably mounted in the camera, and, as here shown, are mounted for rotation on pivot shafts 18 received in suitable bearings diagrammatically shown at 19 (FIG. 2).

Iris blades 15 and 16 overlap throughout a portion of their areas, and accordingly are axially spaced a short distance from one another as shown in FIG. 2, the axial spacing being indicated by 20.

Iris blade 15 has teeth 23 on a portion of its periphery, and iris blade 16 has teeth 24 on a portion of its periphery.

Teeth 23 and 24 mesh with teeth 12 of segment gear 11, as shown in FIG. 1. Teeth 12, as mentioned, have a substantial axial dimension so that they may be engaged by teeth 23 and 24 of the axially spaced iris blades 15 and 16.

The optical axis of the camera is designated 25 in both FIGS. 1 and 2.

Iris blade 15 has a tapered aperture 27 lying on an arc which intersects optical axis 25. Likewise, iris blade 16 has a tapered aperture 28 lying on an arc which intersects optical axis 25. The aforesaid arcs are circular segments centered on the axes of rotation of the respective blades.

As here illustrated, iris blades 15 and 16 are oriented angularly so that the maximum-size portions of the tapered apertures 27 and 28 overlap each other and are aligned with optical axis 25. In this position, the overlapping aperture portions define an iris opening or aperture of maximum size. This iris opening, of course, is that provided by illumination of minimum picture taking intensity which is reflected from a subject, i.e. low illumination.

As the luminous intensity of light reflected from a subject increases, the illustrated movement 9 of meter 8 rotates in clockwise direction in response to the increased electrical energy generated by cell 7. Iris blades 15 and 16, which are geared to segment gear 11 of meter movement 9, are driven correspondingly in counterclockwise direction, thereby bringing portions of the blade openings of smaller size into overlapping relation in alignment with optical axis 25. The intersection on the optical axis of the smaller opening portions defines iris openings of increasingly smaller size, the precise size depending on the intensity of the light falling on cell 7.

The narrowest portions, designated 31 and 32, of the two blade openings define an iris opening of minimum size when they are aligned with optical axis 25 and intersect and overlap each other. Such iris opening is proper in size for maximum picture-taking intensity, e.g. light reflected from a front-lighted subject illuminated by sunlight on a clear day.

For ease of explanation, a number of radial lines 35 are applied to blade 15 in FIG. 1, the lines radiating from the blade axis of rotation and leading to an approximate scale of f numbers. Blade 15 is illustrated in angular position whereby the radial line which leads to "f1.8" on the scale intersects optical axis 25. The other blade 16 is positioned correspondingly. The blades thus are positioned in FIG. 1 to provide an f1.8 iris opening. Measured by the indicated scale, the aforesaid minimum sized opening would have a value of f11.

As previously mentioned, the luminous intensity of direct rays from the sun or other source of illumination, as experienced with a back-lighted or side-lighted subject, is considerably greater than the intensity of illumination reflected from a front-lighted subject, even in bright sunlight. Cell 7, of course, will respond with a greater energy output. Accordingly, with such back or side illumination, meter movement 9 will travel through an additional angle in clockwise direction, compared with its angular travel or position under normal conditions of a brightly front-lighted subject. Blades 15 and 16, in response to the extra travel of movement 9, will rotate in counterclockwise direction through a corresponding additional angle.

The present invention takes advantage of the foregoing to provide an aperture of intermediate size in response to the illumination of a back-lighted or side-lighted subject. The size of the iris opening for this condition may be a stop or two larger (or one or two f numbers smaller) than the iris opening of minimum size, and, as illustrated by way of example in FIG. 1, the opening of intermediate size is achieved by providing enlargements at the otherwise narrow ends of blade openings 27 and 28.

Thus, opening 27 in blade 15 terminates in enlargement 37 and blade opening 28 in blade 16 terminates in enlargement 38. These enlargements intersect on optical axis 25 when the intensity of illumination falling on cell 7 is of the magnitude encountered with back-lighted and side-lighted subjects. The enlarged iris opening provided thereby gives proper exposure to subjects having back-lighted or side-lighted illumination, and thus avoids underexposed pictures which heretofore have been characteristic of automatic exposure controlled cameras under glare conditions of subject illumination.

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

1. In a camera, an automatic exposure control having glare compensation comprising a light meter responsive to the luminous intensity of the camera view field, a plurality of movably mounted cooperating iris blades, drive means interconnecting said iris blades and said light meter whereby said iris blades are moved to provide an iris opening of size properly proportional to the luminous intensity of the camera view field from minimum picture-taking intensity to maximum normal picture-taking intensity, said light meter responsive to luminous intensity in excess of maximum normal picture-taking intensity and said iris blades under such condition having means automatically providing an iris opening of larger than minimum size whereby subjects having back-light and side-light illumination are exposed properly.

2. In a camera, a plurality of movably mounted cooperating iris blades providing an iris opening of size ranging from a maximum for minimum picture-taking subject illumination to a minimum for maximum normal picture-taking subject illumination, light meter means moving said iris blades to vary the iris opening size from maximum to minimum in response to intensity of subject illumination, said iris opening of larger than minimum size when said light meter means responds to illumination in excess of maximum normal picture-taking intensity whereby proper exposure is provided for subjects having back-light, and side-light illumination.

3. In a camera, an automatic exposure control having glare compensation comprising a light meter having a movement responsive to the luminous intensity of the camera view field, a pair of iris blades rotatably mounted on spaced parallel axes, means transmitting motion of said meter movement to rotate said iris blades, said iris blades overlapping each other on the optical axis of the camera at all angular blade positions in the effective rotatable range of said blades, each iris blade having a tapered arcuate aperture therein, said apertures overlapping on the optical axis of the camera and defining on the optical axis an iris opening of size depending on the angular blade positions, the narrow end portions of said apertures each terminating in an enlargement whereby alignment of said enlargements on the optical axis provides an iris opening of size intermediate the maximum and minimum iris openings.

4. In a camera, an automatic exposure control having glare compensation comprising a light meter having a movement responsive to the luminous intensity of the camera view field, an iris blade rotatably mounted on an axis spaced from the optical axis, means transmitting motion of said meter movement to rotate said iris blade, said iris blade having a tapered arcuate aperture intersecting the optical axis throughout the effective rotational range of said blade whereby the aperture portion aligned with the optical axis defines an iris opening of size depending on the angular position of the blade, the narrow end portion of said aperture terminating in an enlargement to provide an iris opening of size intermediate the maximum and minimum iris openings.

5. In a camera, an automatic exposure control comprising an adjustable iris means providing iris openings ranging in size from maximum to minimum, light responsive means movable in one direction for adjusting said iris means to provide iris openings ranging in size from maximum to minimum, and means providing an iris opening of intermediate size when said light responsive means moves in the same direction beyond its position providing an iris opening of minimum size.

6. In a camera, an adjustable iris means providing iris openings ranging in size from maximum to minimum, means movable in one direction for adjusting said iris means to provide iris openings ranging in size from maximum to minimum, and means providing an iris opening of intermediate size when said movable means moves in the same direction beyond its position providing an iris opening of minimum size.

References Cited in the file of this patent

UNITED STATES PATENTS

| | | |
|---|---|---|
| 2,013,362 | Rizdorfer | Sept. 3, 1935 |
| 2,556,546 | Lee | June 12, 1951 |
| 2,580,324 | Schwarz | Dec. 25, 1951 |
| 2,841,064 | Bagby et al. | July 1, 1958 |

FOREIGN PATENTS

| | | |
|---|---|---|
| 941,875 | Germany | Apr. 19, 1956 |